US011858696B2

(12) United States Patent
Luke et al.

(10) Patent No.: US 11,858,696 B2
(45) Date of Patent: Jan. 2, 2024

(54) DISPENSING NOZZLES

(71) Applicant: HEWLETT-PACKARD DEVELOPMENT COMPANY, L.P., Spring, TX (US)

(72) Inventors: Jeff Luke, Boise, ID (US); Dean Richtsmeier, Boise, ID (US); Mathew Lavigne, Boise, ID (US); Sean Daniel Fitzgerald, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 819 days.

(21) Appl. No.: 16/967,959

(22) PCT Filed: May 21, 2018

(86) PCT No.: PCT/US2018/033617
§ 371 (c)(1),
(2) Date: Aug. 6, 2020

(87) PCT Pub. No.: WO2019/226146
PCT Pub. Date: Nov. 28, 2019

(65) Prior Publication Data
US 2020/0369441 A1 Nov. 26, 2020

(51) Int. Cl.

| | |
|---|---|
| ***B65D 47/10*** | (2006.01) |
| ***B05B 15/65*** | (2018.01) |
| ***G03G 15/08*** | (2006.01) |
| *B41J 2/175* | (2006.01) |

(52) U.S. Cl.
CPC .............. *B65D 47/10* (2013.01); *B05B 15/65* (2018.02); *G03G 15/0886* (2013.01); *B41J 2/17506* (2013.01); *B65D 2547/06* (2013.01)

(58) Field of Classification Search
CPC .... B65D 47/10; B65D 2547/06; B05B 15/65; B41J 2/17506; G03G 15/0886
See application file for complete search history.

(56) References Cited

U.S. PATENT DOCUMENTS

| | | | |
|---|---|---|---|
| 4,162,501 | A | 7/1979 | Mitchell et al. |
| 5,359,356 | A | 10/1994 | Ecklund |
| 5,673,073 | A | 9/1997 | Childers et al. |
| 5,751,320 | A | 5/1998 | Scheffelin et al. |
| 5,886,719 | A | 3/1999 | Zepeda |

(Continued)

FOREIGN PATENT DOCUMENTS

| | | |
|---|---|---|
| CN | 1120998 | 4/1996 |
| CN | 1468726 | 1/2004 |

(Continued)

*Primary Examiner* — Frederick C Nicolas
(74) *Attorney, Agent, or Firm* — Foley & Lardner LLP

(57) ABSTRACT

A device may include a dispensable substance container to hold a dispensable substance; a dispensing nozzle attached to the dispensable substance container to dispense the dispensable substance out of an opening in the dispensing nozzle; and a frangible obstruction encompassing the dispensing nozzle and obstructing the opening of the dispensing nozzle wherein the frangible obstruction is to slide along the dispensing nozzle to uncover the opening when broken free from the dispensing nozzle by a wall of a receiving container during an engagement between the dispensable substance container and the receiving container.

15 Claims, 3 Drawing Sheets

(56) References Cited

U.S. PATENT DOCUMENTS

| | | | | |
|---|---|---|---|---|
| 5,992,987 | A * | 11/1999 | Childers | B41J 2/17523 347/85 |
| 6,158,851 | A | 12/2000 | Zepeda | |
| 7,845,781 | B2 | 12/2010 | Silverbrook et al. | |
| 8,025,653 | B2 | 9/2011 | Capitaine et al. | |
| 11,364,722 | B2 * | 6/2022 | Luke | B67D 7/02 |
| 2017/0355191 | A1 | 12/2017 | Mizutani et al. | |
| 2020/0398578 | A1 * | 12/2020 | Luke | B41J 2/17533 |
| 2020/0399046 | A1 * | 12/2020 | Luke | B05B 11/02 |
| 2021/0291538 | A1 * | 9/2021 | Williams | B41F 31/02 |
| 2021/0309014 | A1 * | 10/2021 | Luke | B41J 2/17506 |

FOREIGN PATENT DOCUMENTS

| | | |
|---|---|---|
| CN | 202805943 | 3/2013 |
| JP | 56-130775 | 10/1981 |

* cited by examiner

DISPENSING NOZZLES

CROSS REFERENCE TO RELATED APPLICATIONS

This application is a U.S. National Stage Application which claims the benefit under 35 U.S.C. § 371 of International Patent Application No. PCT/US2018/033617 filed on May 21, 2018, the contents of which are incorporated herein by reference.

BACKGROUND

Containers may be utilized to contain, store, and/or transport substances. Containers may contain substances that may be dispensed from the containers. For example, some containers may be utilized to dispense the dispensable substances into other containers. Containers may leak or spill. For example, containers that may be utilized to dispense a dispensable substance may prematurely dispense the substance.

DETAILED DESCRIPTION

Figure 1:
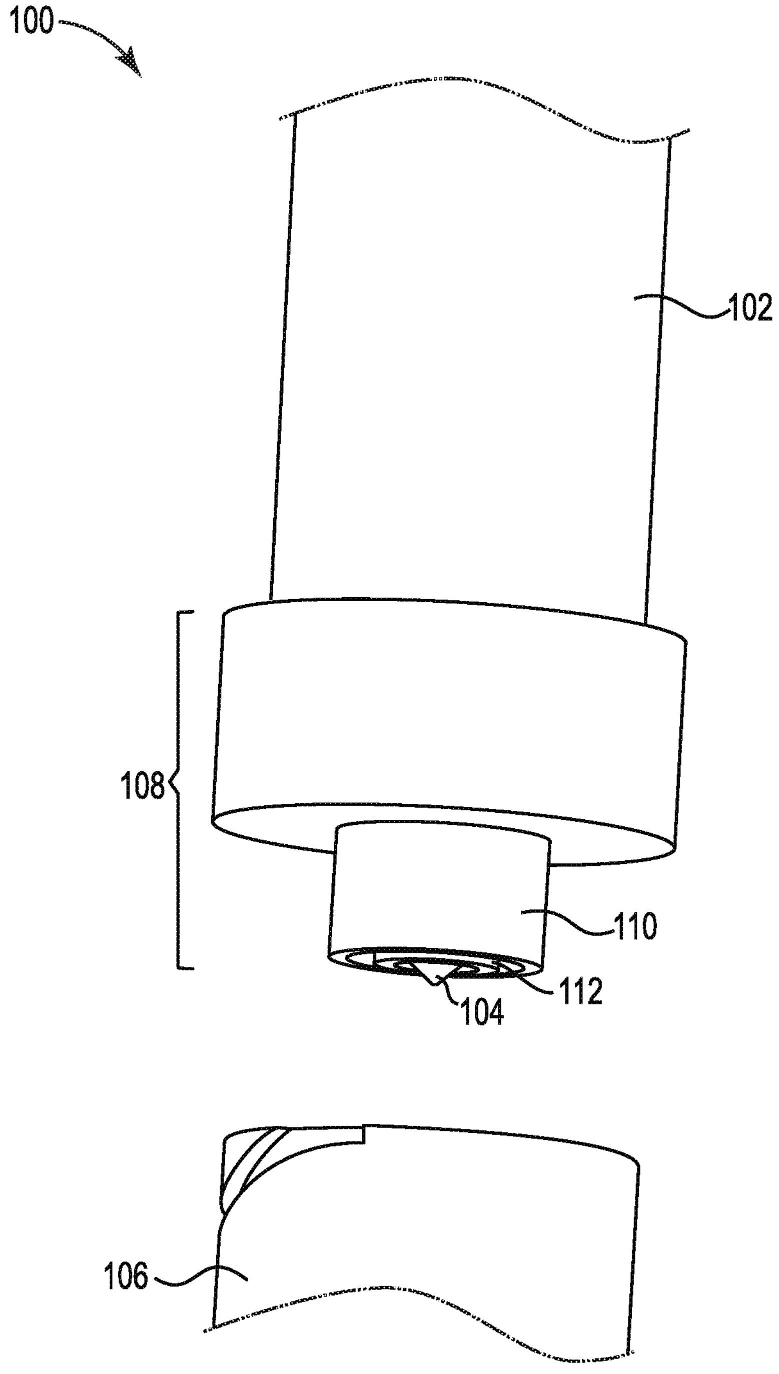
FIG. 1 illustrates a side view of an example of a device according to the present disclosure.

A container may include a body for containing a dispensable substance. The body may include walls that encompass and/or define a lumen within the body for containing a dispensable substance. A container may operate to exclude a dispensable substance from the environment and/or vice versa.

In some examples, a container may include a specialize structure to dispense the dispensable substance from the container. For example, some containers may include a nozzle to direct the dispensable substance dispensed from the container. The nozzles of such containers may be leak-prone areas of the container, may jeopardize the separate of the dispensable substance and the environment when not being dispensed, may complicate the design and use of the container, and may create more spills and leaks than a container without a nozzle.

For example, in order for a nozzle to direct the dispensable substance, the nozzle may include an opening between the internal lumen of the container and the external environment. An exposed opening between the lumen and the external environment may cause leaking or spills if the dispensable substance encounters the opening, for example, during shipping, storage, or prior to an intended dispensing of the dispensable substance. Further, even if the dispensable substance does not unintendedly escape the opening, contaminants from the environment may enter into the lumen of the container and contaminant the dispensable substances. Such contaminants may include particulate matter, reactants, atmosphere, gases, liquids, solids, etc. that may modify or destroy the dispensable substance or even a receiving container or device that the dispensable substance may be dispensed into.

As such, some containers may include a structure to seal the nozzle from the environment. For example, some container may include a cap such as a screw-on cap that is threaded onto the container to cover the nozzle when not being used to dispense the dispensable substance. However, a screw-on cap mechanism may become loose during transport and may allow a leak.

Further, the screw-on cap mechanism may seal the nozzle during storage and then be removed prior to dispensing the dispensable substance. However, there may be intervening moments and or processes between removing the cap and beginning to dispense the dispensable substance. For example, the container may be inverted, aligned with a receiving container, and/or inserted some distance into a receiving container. During such processes, the dispensable substance contents of the lumen may be exposed to contaminants and/or leak through the nozzle. This may lead some users to utilize bulky extra equipment such as funnels, which can also be a source for contamination and spills, to further direct the flow of the dispensable substance.

Still other containers may be designed with additional volume in the lumen, which is not filled with a dispensable substance, in order to introduce some margin in container movement without causing leakage during the dispensing process. However, such a strategy may utilize more materials in constructing the container than would otherwise be utilized to contain only the dispensable substance, which leads to increased manufacturing costs, higher shipping costs, and/or lower profit margins. In addition, a screw-on cap mechanism may lead a user to determine that, since a cap may be screwed on and/or off repeatedly, the container is reusable for storing and/or dispensing a dispensable substance. Not only could this lead to decreased consumption of the container product but reusing such containers may be a source of contamination for the dispensable substance.

Other examples of containers may utilize a valve internal to the nozzle. For example, some containers may include a rubber valve that is designed to open once a pressure within the lumen of the container reaches a threshold amount and exposes the contents of the lumen to the outside environment. For example, a valve may be designed to open and dispense a dispensable substance out through the nozzle in response to the container being squeezed to raise the internal pressure over the threshold amount.

However, such valve designs may suffer from being imprecise. For example, the amount of force that a user should use in squeezing the container may not be evident to the user and/or may change with the amount of dispensable substance remaining in the lumen of the container leading to an over or under application of force. An under-application of force may result in slow dispensing or no dispensing. An over-application of force may lead to a high-pressure burst of the dispensable substance which may damage the seal and/or cause a receiving container to receive too much of the dispensable substance in too short a period of time such that it cannot accommodate the flow and will overflow or otherwise cause a spill. Moreover, the internal valve material may wear out over time and/or through exposure to the environment which may contribute to the above describe inconsistency in the force needed to actuate the valve and/or to general leakage during storage or premature leakage during dispensing. As with the screw-on mechanism, the internal valve mechanism may lead a user to determine that, since the valve opens and/or closes repeatedly, the container is reusable for storing and/or dispensing a dispensable substance. Not only could this lead to decreased consumption of the container product but reusing such containers may be a source of contamination for the dispensable substance.

The manufacture and/or use of containers with nozzles may yield an increased risk of leaks, spills, contamination, and/or damage to a dispensable substance and/or corresponding device. Utilizing containers without such nozzles in favor of bulky and/or cumbersome funnels not only may not reduce the incidences of such leaks, spills, contamination, and/or damage, but also may interfere with fitting a dispensing container within a confined space and/or mating the dispensing container to a receiving container when dispensing the dispensable substance. Complications with fitting a container in a space and/or getting a proper mating between containers may further contribute to leaks, spills, contamination, and/or damage.

In contrast, examples of the present disclosure may include systems and devices for sealing a dispensing nozzle of a dispensable substance container until the container is mated with a receiving container. The systems and devices may operate to keep the dispensable substances sealed within the dispensable substance container until the dispensable substance container mates with a receiving container, at which time fluid communication between the two may be established. Therefore, the systems and devices may maintain a sealed lumen of the receiving container during shipping, transport, storage, etc. preventing leaks and prevent premature leaking of a dispensable substance during initiation of a dispensing process.

For example, an example of a system of the present disclosure may include a dispensable substance container to hold a dispensable substance and a mating mechanism attached to the dispensable substance container, the mating mechanism including a dispensing nozzle attached to the dispensable substance container to dispense the dispensable substance out of an opening in the dispensing nozzle and a frangible obstruction fixed over the opening in the dispensing nozzle. The system may additionally include a receiving container to receive the dispensable substance dispensed from the opening in the dispensing nozzle, the receiving container including an inner receiving container wall encompassing a passageway for the dispensable substance dispensed from the opening in the dispensing nozzle, the receiving container wall to break the frangible obstruction when the receiving container and the mating mechanism are joined.

FIG. 1 illustrates a side view of an example of a device 100 according to the present disclosure. The device 100 may include a dispensable substance container 102. The dispensable substance container 102 may include a body. The body may include walls encompassing and/or defining a lumen within the confines of the body. The walls of the disposable substance container 102 may separate contents within the lumen of the dispensable substance container 102 from the external environment.

The dispensable substance container 102 may contain a dispensable substance within the lumen. The dispensable substance may include a solid, a liquid, and/or a gas. The dispensable substance container 102 may be filled with the dispensable substance, the dispensable substance may flow through the dispensable substance container 102, and the dispensable substance may be dispensed from the dispensable substance container 102. In an example, the dispensable substance may include a liquid printing ink, a printing toner powder, and/or three-dimensional printing substance, etc.

The dispensable substance container 102 may be sealed from the external environment. For example, the body of the dispensable substance container 102 and its contents may be sealed from the external environment at a first end. For example, at a first end of an elongate body of a dispensable substance container 102, a sealing material and/or a pushrod assembly may block the dispensable substance within the lumen dispensable substance container 102 from interacting with the external environment. Such examples may include a syringe-like geometry for the dispensable substance container 102. Such a container may operate as a single-acting reciprocating pump. For example, a force load may be applied to a portion of the pushrod assembly protruding from the dispensable substance container 102. The pushrod may engage against the dispensable substance and initiate flow of the dispensable substance through and/or from the dispensable substance container 102 and the pushrod is advanced through the lumen of the dispensable substance container 102. However, other examples, of the dispensable substance container 102 may not include elongate bodies, sealing materials, and/or pushrod assemblies. The examples described herein are applicable to any geometry of dispensable substance container 102. Further, in some examples dispensing the dispensable substance from the dispensable substance container 102 may not utilize a pushrod mechanism, but may occur as a result of squeezing the dispensable substance container 102, a gravity feed, etc.

The dispensable substance container 102 may be sealed from the external environment at a second end. For example, the dispensable substance container 102 may be sealed from the external environment at a second end of an elongate body of the dispensable substance container 102 that is opposite the first end. The dispensable substance container 102 may be sealed from the external environment by a sealed dispensing nozzle 104.

The dispensing nozzle 104 may be part of a mating mechanism 108 attached to the dispensable substance container 102. The mating mechanism 108 may be a part or parts that are initially separate from the dispensable substance container 102 but are fixed to the dispensable substance container 102 by fastening or press fit mechanisms. In other examples, the mating mechanism 108 may be a part or parts that are portions of a single molded assembly.

The dispensing nozzle 104 may include a wall shaped to control the direction and/or characteristics of the flow of the dispensable substance from the dispensable substance container 102. In some examples, the walls of the dispensing nozzle 104 may encompass and/or define a lumen that has a smaller volume and/or diameter than the lumen of the dispensable substance container 102. In some examples, the walls of the dispensing nozzle 104 may be tapered to a point.

The dispensing nozzle 104 may include an opening (not visible in FIG. 1). The opening may be one of a plurality of openings in the dispensing nozzle 104. The opening may be arranged along and through a portion of the sidewalls of the dispensing nozzle 104. That is, in some examples, the opening may not be through the tapered tip of the dispensing nozzle 104 but along a shaft of the dispensing nozzle 104 between the tip and the hub of the dispensing nozzle where it opens into the lumen of the dispensable substance container 102. The lumen of the dispensing nozzle 104 may be in fluid communication with the lumen of the dispensing substance container 102. The opening in the dispensing nozzle may be an opening where a dispensable substance expelled from the lumen of the dispensable substance container 102 is dispensed.

The dispensing nozzle 104 may have a complementary geometry and dimensions for insertion into a dispensable substance receiving container 106. The dispensable substance receiving container 106 may include a container for receiving and/or storing the dispensable substance that is dispensed from the dispensable substance container 102. In some examples, the dispensable substance receiving container 106 may include a printing substance reservoir or cartridge. For example, the dispensable substance receiving container 106 may be a portion of a printing device that serves as a reservoir for the dispensable printing substance until a time when the dispensable printing substance is to be utilized for a printing operation of the printing device. The dispensable substance receiving container may include a printing substance supply cartridge that directly supplies the printing substance to a printing head or other printing mechanism without intermediaries or conduits.

The mating mechanism 108 may include a mating wall 110 extending longitudinally along a portion of the length of the dispensing nozzle 104 and/or encompassing the dispensing nozzle 104. The mating wall 110 may define a cavity. The dispensing nozzle 104 may be located within the cavity. The dispensing nozzle 104 may be located within a center of the cavity. A gap may be present between an inner surface (e.g., surface open to and/or facing into the cavity) of the mating wall 110 and the dispensing nozzle 104. That is, the inner surface of the mating wall 110 may not make contact with the shaft and/or the tip of the dispensing nozzle 104.

The mating wall 110 may have a geometry and dimensions complementary to a receiving mating mechanism (not visible in FIG. 1) of the dispensable substance receiving container 106. That is, the mating wall 110 attached to dispensable substance container 102 and the receiving mating mechanism of the dispensable substance receiving container 106 may be complementary mating mechanisms which slide together in an interlocking fashion to mate the two together by aligning the dispensing nozzle 104 with an opening in a dispensing substance receiving container 106, as described in further detail below.

The mating mechanism 108 may include an obstruction 112 over the openings in the dispensing nozzle 108. That is, the obstruction 112 may block openings in the dispensing nozzle 108. As such, the obstruction 112 may seal the openings in the dispensing nozzle 108 from the external environment. Further, the obstruction 112 may seal the contents of the lumen of the dispensing nozzle 104 and, by virtue of fluid communication between the two lumens, the contents of the lumen of the dispensable substance container 102 from the external environment. The seal may prevent a dispensable substance from leaking, spilling, or being inadvertently dispensed from the dispensing nozzle 104 of the dispensable substance container 102.

The obstruction 112 may be fixed in place obstructing the openings in the dispensing nozzle 104. That is, the obstruction 112 may fixed over the openings of the dispensing nozzle 104 such that gravity, jostling, and/or a force under a particular force load threshold will not move the obstruction 112 from is fixed position over the openings. In some examples, the obstruction 112 may be fixed to the dispensing nozzle 104. For example, the obstruction 112 may be fixed to the dispensing nozzle 104 by a bond. The bond may include an adhesive, a fastener, a friction fit, a press fit, a bonding with a solvent, a joining, a heat fusion, an ultrasonic weld, molding onto the dispensing nozzle 104, otherwise mating, etc.

However, the obstruction 112 may be a frangible obstruction. That is, the frangible obstruction 112 may be engineered to break free from its attachment, introducing fluid communication between the lumen of the dispensing nozzle 104 and an external environment by uncovering the openings on the dispensing nozzle 104 in response to the application of a force load over a force load threshold to the obstruction 112. A frangible obstruction 112 may include an obstruction 112 where the body of the obstruction 112 itself is frangible or an obstruction 112 where an attachment between the body of the obstruction 112 and, for example, the dispensing nozzle 104 is frangible. For example, a body of a frangible obstruction 112 may be made of a material that is relatively thinner, is more brittle, is softer, is more frangible, is more prone to failure under shear stress, has lower shear strength, etc. than the material of the dispensing nozzle 104. Alternatively or additionally, the frangible obstruction 112 may be made of a material that is a substantially same material as the dispensing nozzle but the attachment between the frangible obstruction 112 and the dispensing nozzle 104 may be relatively thinner, more brittle, softer, more frangible, etc. than the material of the dispensing nozzle 104.

The frangible obstruction 112 may include a sleeve including a body encompassing the dispensing nozzle 104. The frangible obstruction 112 may include a sleeve that partially or fully encompasses the dispensing nozzle 104. In examples where the dispensing nozzle 104 has a cylindrical geometry, the sleeve may have a toroidal geometry such as a rectangular or square torpid that encompasses the cylindrical nozzle 104 obstructing the openings thereupon. In examples where the dispensing nozzle 104 has another type of geometry, the sleeve may have another type of geometry that facilitates contact with and/or obstruction of the openings on the dispensing nozzle 104.

The frangible obstruction 112 may be broken when it is mated with the receiving mating mechanism of the dispensable substance receiving container 106. As described in greater detail below, the interlocking of the mating mechanism 108 with the receiving mating mechanism of the dispensable substance receiving container 106 may break the frangible obstruction 112, introducing fluid communication between the lumen of the dispensing nozzle 104 and a lumen defined by a body of the dispensable substance receiving container 106. Breaking the frangible obstruction 112 may include breaking the frangible obstruction 112 free from its position fixed over the openings of the dispensing nozzle 104 by breaking an attachment between the frangible obstruction 112 and the dispensing nozzle 104. Breaking the frangible obstruction 112 may include breaking the frangible obstruction 112 free from its position fixed over the openings of the dispensing nozzle 104 by breaking the body of the frangible obstruction to expose the openings of the dispensing nozzle 104.

In some examples, a force load over a threshold force load may be applied in mating the mating mechanism 108 with the receiving mating mechanism of the dispensable substance receiving container 106. The mating mechanism 108 and receiving mating mechanism of the dispensable substance receiving container 106 may translate that force load into a shearing force applied, at least partially, to the frangible obstruction 112 to break the frangible obstruction.

Figure 2:
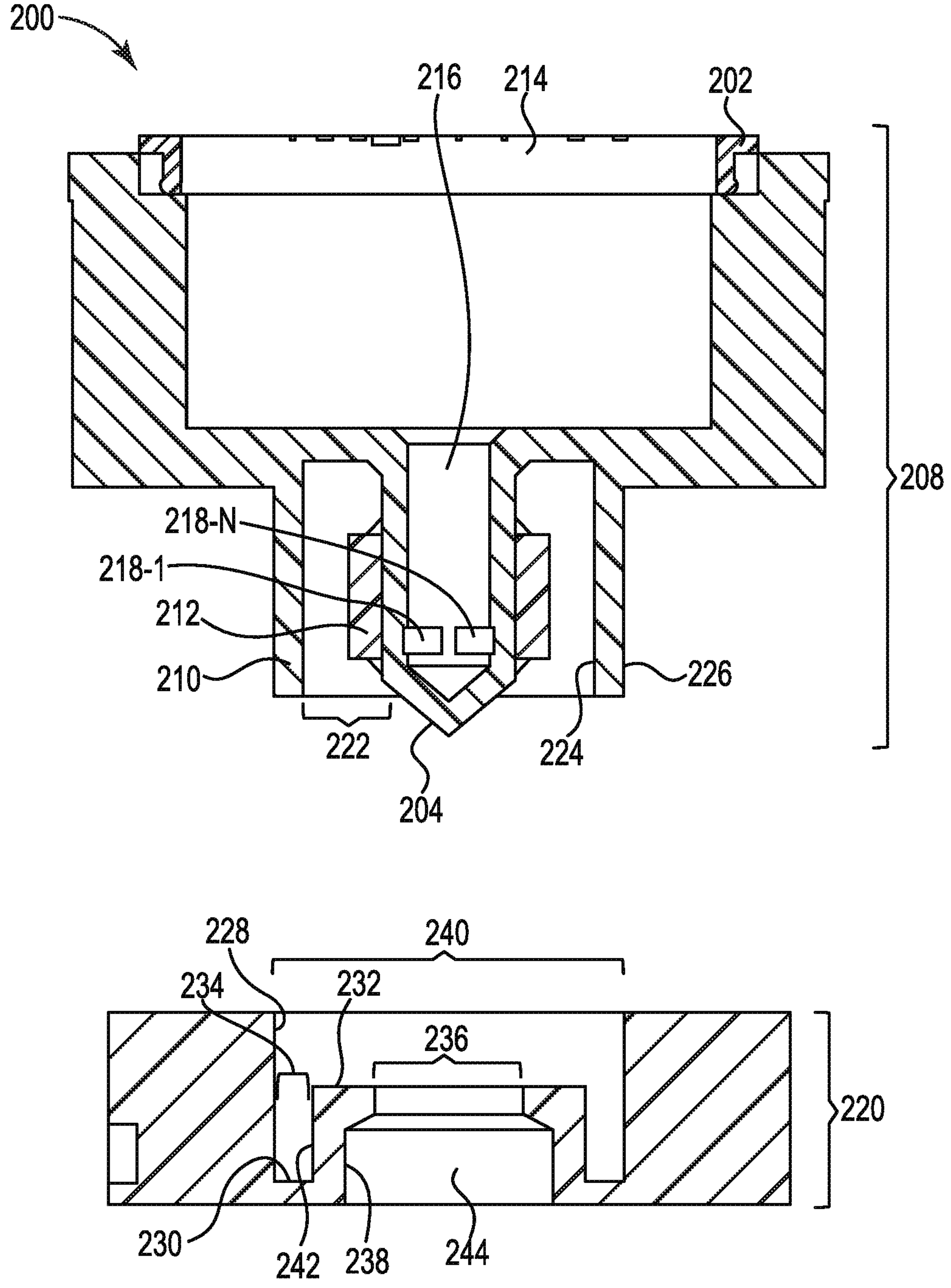
FIG. 2 illustrates a side view of a cross-section of an example of a device according to the present disclosure.

FIG. 2 illustrates a cross-section side view of an example of a device 200 according to the present disclosure. The device 200 may include a dispensable substance container 202. The dispensable substance container 202 may include walls that define a lumen. The lumen may be a hollow cavity where a dispensable substance may be held.

The device 200 may include a mating mechanism 208. The mating mechanism 208 may be attached to and/or a continuous portion of the dispensable substance container 202. The mating mechanism 208 may be located at or near a lower end and/or a bottom portion of the dispensable substance container 202 when dispensing, such that, the dispensing of the dispensable substance within the dispensable substance container 202 is aided by gravity and/or hydrostatic pressure. However, the mating mechanism 208 may be present on any portion of the dispensable substance container 202.

The device 200 may include a dispensing nozzle 204. The dispensing nozzle 204 may include a wall to control the direction and/or characteristics of the flow of the dispensable substance from the lumen 214 dispensable substance container 202. In some examples, the walls of the dispensing nozzle 104 may encompass and/or define a dispensing nozzle lumen 216 that has a smaller volume and/or diameter than the lumen 214 of the dispensable substance container 202. The dispensing nozzle lumen 216 and the lumen 214 of the dispensable substance container 202 may be in fluid communication with one another.

The dispensing nozzle 204 may include a hub portion where the walls of the dispensing nozzle flare out and open to the lumen 214 of the dispensable substance container 202. The dispensing nozzle 204 may include an elongate shaft extending from the hub and encompassing the lumen 216 of the dispensing nozzle 204. The shaft may include sidewalls defining the lumen 216 that eventually join to form a terminus or tip of the dispensing nozzle 204. For example, the walls of the shaft may abruptly taper to a pointed tip of the dispensing nozzle 204.

The lumen 216 of the dispensing nozzle 204 may be tapered and/or closed at the tip. The dispensing nozzle 204 may include openings 218-1 . . . 218-N through the wall of the dispensing nozzle 204 into the lumen 216 of the dispensing nozzle 204. For example, the dispensing nozzle 204 may include openings 218-1 . . . 218-N through a sidewall of an elongate shaft of the dispensing nozzle 204. The openings 218-1 . . . 218-N may have a geometry and dimension that allows a dispensable substance to flow out of the openings 218-1 . . . 218-N when being dispensed.

The device 200 may include a frangible obstruction 212 fixed over the openings 218-1 . . . 218-N of the dispensing nozzle 204. The frangible obstruction 212 itself and/or an attachment between the frangible obstruction 212 and the dispensing nozzle 204 may be frangible. The frangible obstruction 212 and/or its attachment may be designed to fail and/or break free under a force load that is less than a force load associated with breaking other non-frangible components of the mating mechanism 208. For example, the material forming the attachment points between the frangible obstruction 212 and the dispensing nozzle 204 may be relatively thin compared to the thickness of the material of the dispensing nozzle 204 and/or the other components of the mating mechanism 208. Once the frangible obstruction 212 and/or its attachment points are broken, the openings 218-1 . . . 218-N may be exposed to the environment outside of the dispensing nozzle 204.

The device 200 may include a dispensing-side mating wall 210. The dispensing-side mating wall 210 may extend longitudinally along a portion of the length of the dispensing nozzle 204 and/or may encompass or encircle the dispensing nozzle 204. The dispensing-side mating wall 210 may define a cavity 222. The dispensing nozzle 204 may be located within the cavity 222, The dispensing nozzle 204 may be located within a center of the cavity 222. A void may be present between an inner surface 224 of the dispensing-side mating wall 210 and the dispensing nozzle 204. That is, the inner surface 224 of the dispensing-side mating wall 210 may not make contact with the shaft and/or the tip of the dispensing nozzle 204. The inner surface 224 of the dispensing-side mating wall 210 may be opposite an outer surface 226 of the dispensing-side mating wall 210.

The device 200 may include a receiving mating mechanism 220. The receiving mating mechanism 220 may be a portion of a dispensable substance receiving container (such as dispensable substance receiving container 106 in FIG. 1) and/or a passageway 244 to the dispensable substance receiving container. The receiving mating mechanism 220 may include a plurality of walls (e.g., outer receiving container wall 228 and inner receiving container wall 232) encompassing an opening 236 into the dispensable substance receiving container and/or a passageway 244 into the dispensable substance receiving container.

For example, the receiving mating mechanism 220 may include an outer receiving container wall 228. The outer receiving container wall 228 may encompass and/or define an outer periphery of an inlet port 240 of the receiving mating mechanism 220. Outer receiving container wall 228 may define an inlet port 240 having a geometry and/or dimensions complementary to the dispensing-side mating wall 210. For example, the outer receiving container wall 228 may define an inlet port 240 having a geometry and/or dimensions to accept insertion of the dispensing-side mating wall 210 into the inlet port 240. The dispensing-side mating wall 210 may fit snuggly but moveably within the inlet port 240. The outer surface 226 of the dispensing-side mating wall 210 may engage with and/or slide along the outer receiving container wall 228 defining the inlet port 240 as the dispensing-side mating wall 210 is slid within the inlet port 240 during mating of the mating mechanism 208 with the receiving mating mechanism 220.

The receiving mating mechanism 220 may include a bottom wall 230. The bottom wall 230 may include a perpendicular extension of the outer receiving container wall 228 at a bottom of the inlet port 240. The bottom wall 230 may define a stop defining a limit of how far into the inlet port 240 that the dispensing-side mating wall 210 may be slid.

The receiving mating mechanism 220 may include an inner receiving container wall 232. The inner receiving container wall 232 may include an outer surface 242 and an inner surface 238. The inner receiving container wall 232 may encompass and/or define an opening 236 into the dispensable substance receiving container. The inner receiving container wall 232 may include a wall that is parallel to the outer receiving container wall 228. A cavity 234 may exist between the outer receiving container wall 228 and the outer surface 242 of the inner receiving container wall 232. The outer surface 242 of the inner receiving container wall 232, the bottom wall 230, and/or the outer receiving container wall 228 may define a cavity 234 having dimensions and geometry to snuggly but moveably fit the dispensing-side mating wall 210 within the cavity 234. For example, when mating the mating mechanism 208 with the receiving mating mechanism 220, the inner surface 224 of the dispensing-side mating wall 210 may engage with and/or slide along the outer surface 242 of the inner receiving container wall 232 while the outer surface 226 of the dispensing-side mating wall 210 may engage with and/or slide along the outer receiving container wall 228 as the dispensing-side mating wall 210 seats within the cavity 234.

By engaging the dispensing-side mating wall 210 with the outer receiving container wall 228 and the outer surface 242 of the inner receiving container wall 232 during mating, an alignment between the mating mechanism 208 and the receiving mating mechanism 220 may be established throughout mating. For example, an alignment may be established and/or maintained whereby the dispensing tip 204 will enter through the opening 236 into a lumen of the dispensable substance receiving container and/or a passageway 244 to the dispensable substance receiving container defined by the inner surface 238 of the inner receiving container wall 232.

As the dispensing-side mating wall 210 engages with the outer receiving container wall 228 and the outer surface 242 of the inner receiving container wall 232 during mating, so too will the outer surface 242 of the inner receiving container wall 232 engage with the inner surface 224 of the dispensing-side mating wall 210 and the inner surface 238 of the inner receiving container wall 232 engage with the elongate shaft portion of the dispensing nozzle 204. As such, during mating, the inner receiving container wall 232 may seat within the cavity 222. Again, the interlocking of the inner receiving container wall 232 with the dispensing-side mating wall 210 and the elongate shaft portion of the dispensing nozzle 204 may establish and maintain the described alignment.

In some examples, the frangible obstruction 212 may protrude from the walls of the dispensing nozzle 204. For example, the frangible obstruction 212 may be a raised protrusion sticking out from the otherwise smooth elongate shaft portion of the dispensing nozzle 204. Meanwhile, the dimensions of the dispensing nozzle 204, the dimensions of a portion of the inner receiving container wall 232, and/or the alignment established and/or maintained by the dispensing-side mating wall 210 seating into cavity 234 while the inner receiving container wall 232 is seating into cavity 222 during joining of the mating mechanism 208 to the receiving mating mechanism 220 may maintain engagement between the inner receiving container wall 232 and the smooth elongate shaft portion of the dispensing nozzle 204. The opening 236 may be just wide enough to accommodate the dispensable nozzle 204 fitting through, but not wide enough to accommodate a protrusion, such as the frangible obstruction 212, from the body of the dispensable nozzle 204 fitting through.

The mating mechanism 208 may be joined to the receiving mating mechanism 220 by pressing them together, by screwing them together utilizing integrated complementary threads and grooves, and/or by other means of mechanically joining. During joining, the inner receiving container wall 232 may come into contact with the frangible obstruction 212. The frangible obstruction 212 may, in addition to obstructing the openings 218-1 . . . 218-N of the dispensing nozzle 204, obstruct the seating of the inner receiving container wall 232 the remainder to the way into the cavity 222. In some examples, a user may feel an increased resistance to joining the mating mechanism 208 to the receiving mating mechanism 220 when the inner receiving container wall 232 engages the frangible obstruction 212 since the dispensing nozzle 204 with the frangible obstruction 212 fixed to it may not fit through the opening 236 defined by the inner receiving container wall 232.

However, the frangible obstruction 212 may be engineered to be frangible. The mating mechanism 208 and/or the receiving mating mechanism 220 may translate a force load applied to, for example, the dispensable substance container 202 into a shearing force of the inner receiving container wall 232 against the frangible obstruction 212. Once a force load over a threshold force load amount is applied to joining the mating mechanism 208 to the receiving mating mechanism 220 the shear force applied to the frangible obstruction 212 by the inner receiving container wall 232 may exceed the shear strength of the frangible obstruction 212. As such, the frangible obstruction 212 may be broken.

Breaking the frangible obstruction 212 may include breaking the frangible obstruction free from its position fixed over the openings 218-1 . . . 218-N. The breaking of the frangible obstruction 212 may occur as the frangible obstruction 212 is sheared away by a leading edge of the inner receiving container wall 232 simultaneous with the dispensing nozzle entering the passageway 244 through the opening 236. As such, as the dispensing nozzle 204 enters the opening 236 and/or the passageway 244 to the dispensing substance receiving container, the frangible obstruction 212 is swept away and fluid communication is introduced between the lumen of the dispensing nozzle 204 and the passageway 244 and/or the dispensable substance receiving container. In this manner, the dispensable substance stays sealed inside the dispensing nozzle 204 and/or the dispensable substance container until the dispensing nozzle is within the passageway 244 and/or the dispensable substance receiving container, obviating spilling issues, leaking issues, premature dispensing issues, etc.

In some examples, the body of the frangible obstruction 212 may be engineered to fail past a force load threshold amount. In such examples, the force load applied to the frangible obstruction 212 via the inner receiving container wall 232 may break the body of the frangible obstruction. In some examples, an attachment-point between the frangible obstruction 212 and the dispensing nozzle 204 may be engineered to fail past a force load threshold amount. In such examples, the force load applied to the frangible obstruction 212 via the inner receiving container wall 232 may break the attachments between the frangible obstruction 212 and the dispensing nozzle 204 that keep the frangible obstruction fixed in place sealing the openings 218-1 . . . 218-N.

Figure 3A:
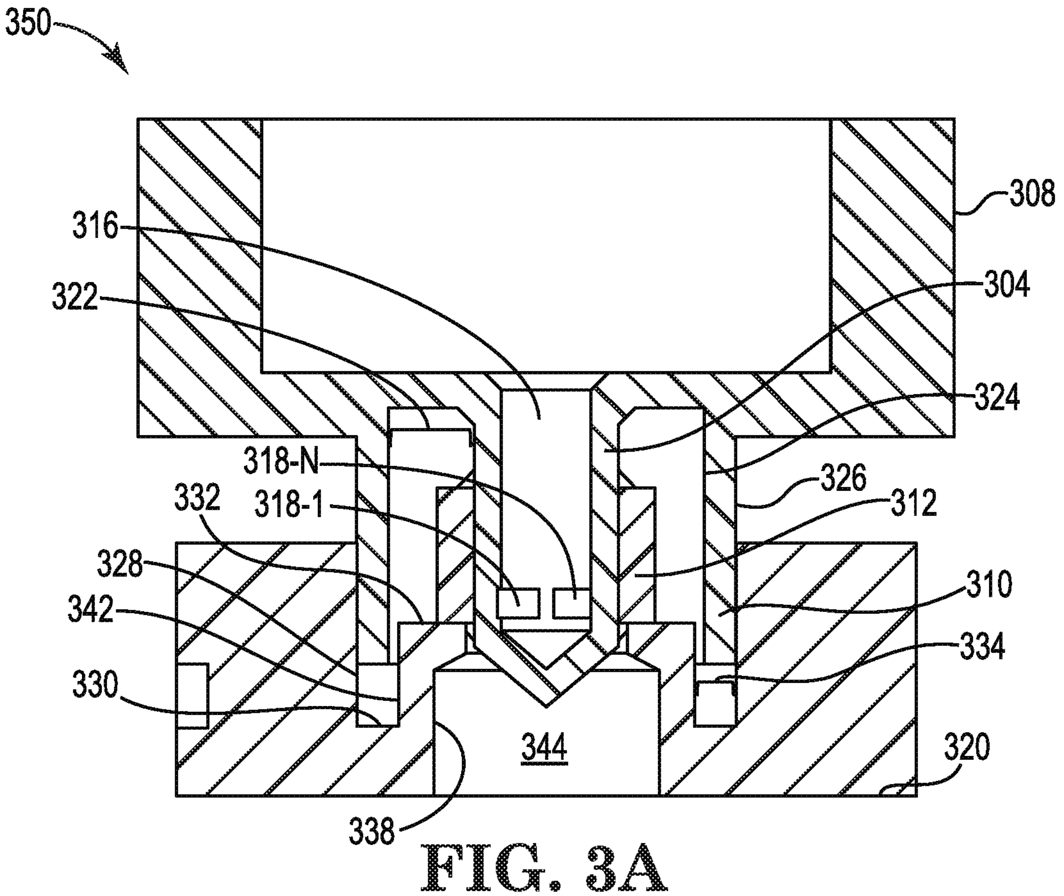
FIG. 3A illustrates illustrate an example of a system including dispensing nozzles according to the present disclosure.
Figure 3B:
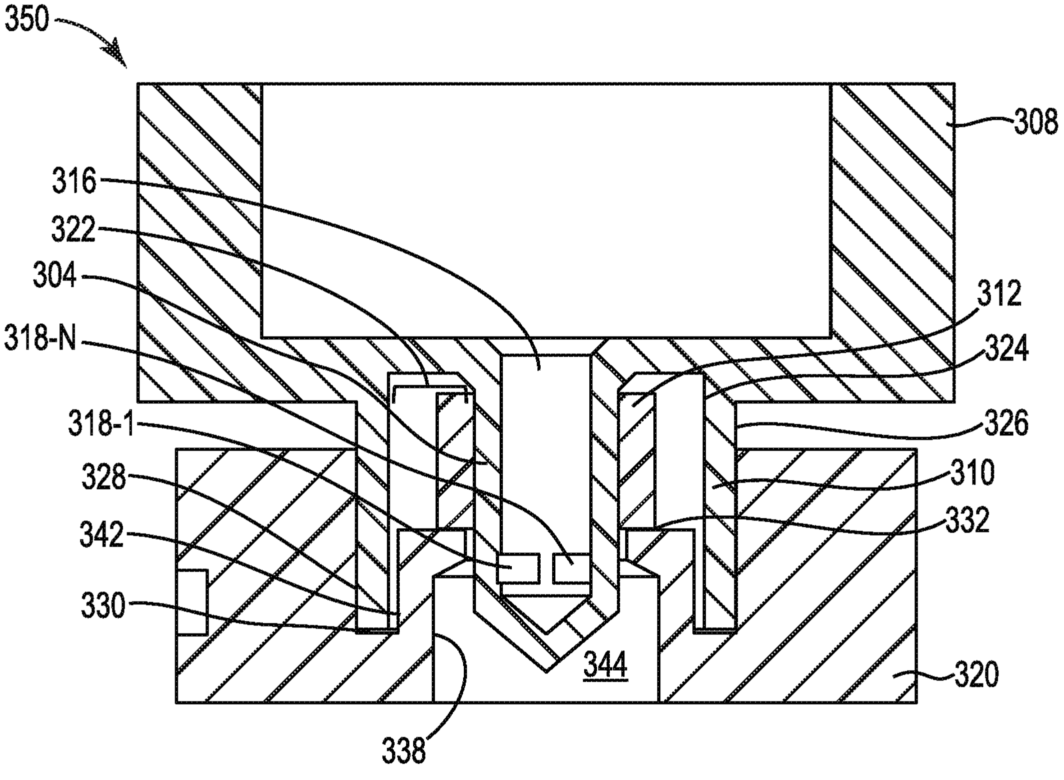
FIG. 3B illustrates illustrate an example of a system including dispensing nozzles according to the present disclosure.

FIG. 3A and FIG. 3B illustrate an example of a system 350 including dispensing nozzles according to the present disclosure. FIGS. 3A-3B may illustrate a progression through successive stages of operating the system 350 of dispensing nozzles according to examples of the present disclosure. FIGS. 3A-3B illustrate cross-sectional views of examples of devices that may be utilized in the system 350.

The system 350 may include a mating mechanism 308. The mating mechanism 308 may be a mating mechanism 308 attached to and/or integrated with a dispensable substance container. As such, some of the components associated with the mating mechanism 308 may be labeled or designated as dispensing-side components or receiving-side components. Such terminology may be utilized for the purposes of clarifying the components of mating mechanism 308 as opposed to the components of the receiving mating mechanism 320. However, such terms may be intended to distinguish and not limit the components to a dispensable substance container or a dispensable substance receiving container. That is, other examples are contemplated within the present disclosure where the mating mechanism 308, or portions thereof, and/or receiving mating mechanism 320, or portions thereof, are on either one or both of a dispensable substance container to dispense the dispensable substance and/or a dispensable substance receiving container to receive the substance dispensed by the dispensable substance container.

The mating mechanism 308 may include a dispensing-side mating wall 310. The dispensing-side mating wall 310 may project out perpendicular to a base portion of the mating mechanism 308, the base portion of the mating mechanism 308 including a wall sealing a portion of a lumen of a dispensable substance container from the external environment. The dispensing-side mating wall 310 may encompass and/or define a lumen within the dispensing-side mating wall 310, the lumen sealed from the lumen of the dispensable substance container at a first end by the base portion of the mating mechanism 308 and open to the external environment at a second end.

The dispensing-side mating wall 310 may include an outer surface 326 that faces the external environment. The dispensing-side mating wall 310 may include an inner surface 324 that faces into the lumen defined by the dispensing-side mating wall 310.

A dispensing nozzle 304 may protrude out, perpendicular to a base portion of the mating mechanism 308 and parallel to the dispensing-side mating wall 310, from the base portion of the mating mechanism 308 within the lumen formed by the dispensing-side mating wall 310. For example, the dispensing nozzle 304 may protrude from the base portion of the mating mechanism 308 within the lumen formed by the dispensing-side mating wall 310 such that the dispensing-side mating wall 310 may encompass the dispensing nozzle 304. The dispensing nozzle 304 may protrude within lumen formed by the dispensing-side mating wall 310 from approximately the center of the lumen formed by the dispensing-side mating wall 310.

Although the dispensing nozzle 304 may be within the lumen formed by the dispensing-side mating wall 310, the dispensing-side mating wall 310 may be set back from the surface of the sidewalls of the dispensing nozzle 304 such that a cavity 322 is present between the inner surface 324 of the dispensing-side mating wall 310 and the sidewalls of the dispensing nozzle 304.

The dispensing nozzle 304 may be a hollow structure. The dispensing nozzle 304 may include a lumen 316 that extends through the base portion of the mating mechanism 308 maintaining fluid communication between the lumen 316 of the dispensing nozzle 304 and the lumen of the dispensable substance container. In some examples, the dispensing nozzle 304 may include elongate sidewalls encompassing and/or defining the lumen 316 that taper to a sealed terminus tip at an end of the dispensing nozzle opposite the base portion of the mating mechanism 308.

The dispensing nozzle 304 may include openings 318-1 . . . 318-N through the sidewall of the dispensing nozzle 304 into the lumen 316 of the dispensing nozzle 304. The openings 318-1 . . . 318-N may be utilized, when exposed, to dispense a dispensable substance from the lumen 316 of the dispensing nozzle 304 and/or from the lumen of the dispensable substance container. A body of the dispensing nozzle 304 may be sealed from the external environment and/or the cavity 322 between the dispensing-side mating wall 310 and the sidewalls of the dispensing nozzle 304 other than at the openings 318-1 . . . 318-N.

The system 350 may include a frangible obstruction 312. The frangible obstruction 312 may include a sleeve. For example, the frangible obstruction 312 may include a tubular fitting encompassing an outer surface of a portion of the sidewall of the dispensing nozzle 304. Prior to joining the mating mechanism 308 to the receiving mating mechanism 320 the frangible obstruction 312 may be fixed in place to the dispensing nozzle 304 over the openings 318-1 . . . 318-N. The frangible obstruction 312 may, therefore, seal the openings thereby sealing the dispensable substance within the lumen 316 of the dispensing nozzle 304 during filling, refilling, packaging, shipping, storing, transportation, handling, preparation for dispensing to a receiving container, the early stages (e.g., initial engagement within the application of particular force load) of the process of joining the mating mechanism 308 to the receiving mating mechanism 320, etc.). For example, in FIG. 3A the frangible obstruction 312 is still fixed in place over the openings 318-1 . . . 318-N sealing in the contents of the lumen 316 of the dispensing nozzle 304.

The system 350 may include a receiving mating mechanism 320. The receiving mating mechanism 320 may include concentric walls encompassing an opening to a passageway 344 and/or the passageway 344 to a lumen of a dispensable substance receiving container. For example, the receiving mating mechanism 320 way include an outer receiving container wall 328. The receiving mating mechanism 320 way include an inner receiving container wall 332. The outer receiving container wall 328 may encompass the inner receiving container wall 332. The inner receiving container wall 332 may encompass an opening to a passageway 344 and/or the passageway 344 to a lumen of a dispensable substance receiving container.

The outer receiving container wall 328 may be separated from the outer surface 342 of the inner receiving container wall 332 by a cavity 334. The cavity 334 may have dimensions and geometry to allow the dispensing-side mating wall 310 to seat within the cavity 334. The cavity 334 may have a depth defined by the bottom wall 230. The bottom wall 230 may act as a stop and/or a rest for the dispensing-side mating wall 310 as it is seated into the cavity 334. The bottom wall 230 may stop the dispensing-side mating wall 310 from progressing any further into the receiving mating mechanism 320.

The outer surface 342 of the inner receiving container wall 332 along with the outer receiving container wall 328 may serve as an aligning guide for the dispensing-side mating wall 310 as the mating mechanism 308 is joined with the receiving mating mechanism 320. Additionally, the outer surface 342 of the inner receiving container wall 332 along with the outer receiving container wall 328 may serve as an aligning guide for the dispensing nozzle 304 since it relative position to the dispensing-side mating wall 310 may be fixed as they both may have fixed positions on the mating mechanism 308.

The inner receiving container wall 332 and/or the inner surface 338 of the inner receiving container wall 332 may encompass and define the passageway 344 and the opening thereto. The inner receiving container wall 332 may have dimensions and a geometry to seat within the cavity 322 of the mating mechanism 308.

The opening into the passageway 344 may have a specific dimension and/or a specific geometry to allow the dispensing nozzle 304 to enter through the opening and seat within the passageway. However, the specific dimension and/or a specific geometry may be such that is precisely accommodates the dispensing nozzle 304, allowing the dispensing nozzle 304 to enter through the opening while a portion of the inner receiving container wall 332 closely hugs, contacts, influences, and/or maintains a relatively small setback from the sidewalls of the dispensing nozzle 304 as it passes through the opening. For example, the dimensional tolerances of the opening defined by the portion of the inner receiving container wall 332 may be such that the dispensing nozzle 304 may pass through the opening relatively unabraded or uncontacted, while a protrusion from the sidewall of the dispensing nozzle that juts into the cavity 322 may encounter and/or engage the portion of the inner receiving container wall 332 during the joining process. For example, in FIG. 3A the frangible obstruction 312 fixed over the openings 318-1 . . . 318-N may encounter the portion of the inner receiving container wall 332 as the mating mechanism 308 is joined with the receiving mating mechanism 320.

Meanwhile, the inner receiving container wall 332 may be engaging with and/or being influenced by the inner surface 324 of the dispensing-side mating wall 310 and the sidewall portion of the dispensing nozzle to seat within the cavity 322 of the mating mechanism 308. Simultaneously, the dispensing-side mating wall 310 may be engaging with and/or being influenced by the outer receiving container wall 328 and the outer surface 342 of the inner receiving container wall 332 to seat within the cavity 334 of the receiving mating mechanism 320. This interlocking between the various walls of the mating mechanism 308 and the receiving mating mechanism 320 may establish and maintain the alignment of the components throughout the joining process.

As described above, the frangible obstruction 312 may be engineered and/or manufactured to break under a force load that exceeds a threshold amount which is less than a threshold amount to break other components of the mating mechanism 308 and the receiving mating mechanism 320. The frangible obstruction 312 may be engineered and/or manufactured to break in a manner that degrades or eliminates the seal of the openings 318-1 . . . 318-N provided by the frangible obstructions 312. For example, the body of the frangible obstruction 312 may be engineered and/or manufactured to break into portions. In another example, the attachments between the frangible obstruction 312 and the dispensing nozzle 304 may be designed to break while preserving the structure of the body of the frangible obstruction 312. For example, a toroidal structure encompassing the portion of the sidewall of the dispensing nozzle 304 where the openings are present 318-1 . . . 318-N may have its ultrasonic welds to the dispensing nozzle broken in a manner that preserves the toroidal structure encompassing the dispensing nozzle 304, but breaks it free from its fixed position allowing it to be translated along the sidewall of the dispensing nozzle further into the cavity 318-N, thereby exposing the openings 318-1 . . . 318-N, such as the example illustrated in FIG. 3B.

Mating or joining a dispensable substance container to a dispensable substance receiving container may include mating or joining the mating mechanism 308 to the receiving mating mechanism 320 as illustrated in FIGS. 3A-3B. In FIG. 3A the interlocking alignment between the mating mechanism 308 to the receiving mating mechanism 320 has been established and may be maintaining alignment between the constituent components of the mating mechanism 308 and the receiving mating mechanism 320. Joining or mating the mating mechanism 308 to the receiving mating mechanism 320 may involve pressing the two together and/or threading one into the other.

During the joining and/or mating process the mating mechanism 308 and the receiving mating mechanism 320 may achieve the state illustrated in FIG. 3A where the inner receiving container wall 332 have encountered and engaged with the frangible obstruction 312. Once such a state is reached, an additional force load may be introduced to proceed. For example, a force load that exceeds a threshold amount to break the frangible obstruction 312 free from the dispensing nozzle 304, but that is less than a threshold amount to break other components of the mating mechanism 308 may be applied by pressing down on and/or twisting the mating mechanism 308 and the receiving mating mechanism 320 together with the additional force load.

As the force load is applied that exceeds the threshold amount to break the frangible obstruction 312 free from the dispensing nozzle, the inner receiving container wall 332 may be utilized to translate that force load into a shearing force. The shearing force may exceed the shear strength of the frangible obstruction 312 to resist it. In that moment, the frangible obstruction 312 may be broken free from its attachment to the dispensing nozzle 304.

The inner receiving container wall 332 may have a height dimension measurable from the bottom wall 330 which is less than a height dimension of the outer receiving container wall 328 measurable from the bottom wall 330. This height difference may result in the inner receiving container wall 332 having an insufficient length to seat fully into the cavity 322 when the mating mechanism 308 and the receiving mating mechanism 320 are joined together, while still allowing the outer receiving container wall 328 to influence alignment prior to an engagement between the inner receiving container wall 332 and the frangible obstruction 318-1 . . . 318-N to alleviate leaks, spills, premature dispensing, and/or broken parts associated with a malalignment.

Further, because of the height of the inner receiving container wall 332, a portion of the depth of cavity 322 may be preserved during full engagement (e.g., dispensing-side mating wall 310 seated within cavity 334 against bottom wall 330) between the mating mechanism 308 and the receiving mating mechanism 320, as illustrated in FIG. 3B. The reserve capacity of cavity 322 may be utilized to hold the broken frangible obstruction 312 and/or its broken attachments up and away from the openings 318-1 . . . 318-N while a dispensable substance is dispensed through the opening into the passageway 344. For example, the inner receiving container wall 332 may shear off the frangible obstruction 312 at is passes through the opening and may translate and/or sweep the resulting debris and/or broken free structure of the frangible attachment 312 up into the cavity 322 in a manner that isolates them from the openings 318-1 . . . 318-N and/or from the passageway 344.

Frangible debris may represent a source of contamination and/or a source of damage to the dispensable substance receiving container and/or a downstream machine such as a printing device. Therefore, translating and confining such debris away from the dispensable substance being dispensed and the lumens of the containers between which it is being dispensed may preserve the life of the dispensable substance and the life of a machine utilizing the dispensable substance, while preserving a last-moment introduction of fluid communication between the containers.

Last-moment introduction of fluid communication between the dispensable substance container and the dispensable substance receiving container may include establishing fluid communication between the lumen of the dispensable substance container and the lumen of the dispensable substance receiving container at or near a moment when a dispensing nozzle of one container is inserted into a passageway or directly into a lumen of a second container. Shearing off the frangible obstruction from the openings of a dispensing nozzle as the dispensing nozzle passes through an opening into a passageway may be an example of a last-moment introduction of fluid communication between the containers. By restricting the fluid communication of the dispensable substance from the dispensable substance container until the dispensable substance container is mated to a dispensable substance receiving container including the dispensing nozzle being within a passageway to the dispensable substance receiving container, leaks, spills, contamination, premature dispensing, etc. may be prevented.

Furthermore, a portion of the dispensable substance containers may be fully consumable and/or non-reusable as a result of breaking the frangible obstruction during mating the mating mechanisms of the dispensing and receiving containers. A non-reusable dispensable substance container may not only generate increased demand for a product by making it consumable but may also prevent unintended reuse by a user that may result in contamination of a dispensable substance. Contamination of a dispensable substance such as a printing material that may lead to the introduction of contaminants to a dispensable substance receiving container such as a printing substance reservoir. The contaminants may be introduced from the printing substance reservoir to a device such as a printing device, which may damage the printing device.

The devices and/or systems described herein are not intended to be limited to any specific example described herein. The components of specific examples of devices and/or the systems described herein may be interchangeable with components of other specific examples of devices and/or the systems described herein.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. For example, the reference numeral 102 may refer to element "02" in FIG. 1 and an analogous element may be identified by reference numeral 202 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure and should not be taken in a limiting sense. Further, as used herein, "a" element and/or feature can refer to one or more of such elements and/or features.

What is claimed:

1. A device, comprising:

a dispensable substance container to hold a dispensable substance;

a dispensing nozzle attached to the dispensable substance container to dispense the dispensable substance out of an opening in the dispensing nozzle; and a frangible obstruction encompassing the dispensing nozzle and obstructing the opening of the dispensing nozzle wherein the frangible obstruction is to slide along the dispensing nozzle to uncover the opening when broken free from the dispensing nozzle by a wall of a receiving container during an engagement between the dispensable substance container and the receiving container, wherein the frangible obstruction is located within a cavity between the dispensing nozzle and a side mating wall of a mating mechanism attached to the dispensable substance container.

2. The device of claim 1, wherein the dispensable substance is a printing substance and the receiving container is a printing substance reservoir cartridge of a printing device.

3. The device of claim 1, wherein the dispensing nozzle includes an elongate shaft encompassing a lumen and the opening into the lumen is present through a sidewall of the elongate shaft.

4. The device of claim 3, wherein the frangible obstruction seals the dispensable substance within the lumen of the elongate shaft until a frangible attachment between the frangible obstruction and the dispensing nozzle is broken.

5. The device of claim 4, wherein the frangible attachment is a bond between the dispensing nozzle and the frangible obstruction.

6. A system, comprising:

a dispensable substance container to hold a dispensable substance;

a mating mechanism attached to the dispensable substance container, the mating mechanism including:

a dispensing nozzle attached to the dispensable substance container to dispense the dispensable substance out of an opening in the dispensing nozzle, and a frangible obstruction fixed over the opening in the dispensing nozzle; and a receiving container to receive the dispensable substance dispensed from the opening in the dispensing nozzle, the receiving container including:

an inner receiving container wall encompassing a passageway for the dispensable substance dispensed from the opening in the dispensing nozzle, the inner receiving container wall to break the frangible obstruction when the receiving container and the mating mechanism are joined.

7. The system of claim 6, wherein the mating mechanism includes dispensing-side mating wall encompassing a cavity between the dispensing nozzle and the dispensing-side mating wall.

8. The system of claim 7, wherein the receiving container includes an outer receiving container wall encompassing a cavity between the inner receiving container wall and the outer receiving container wall.

9. The system of claim 8, wherein the dispensing-side mating wall seats within the cavity between the inner receiving container wall and the outer receiving container wall when the dispensable substance receiving container and the mating mechanism are joined.

10. The system of claim 9, wherein the inner receiving container wall seats within the cavity between the dispensing nozzle and the dispensing-side mating wall when the dispensable substance receiving container and the mating mechanism are joined.

11. The system of claim 10, wherein the frangible obstruction is translated into the cavity between the dispensing nozzle and the dispensing-side mating wall when the dispensable substance receiving container and the mating mechanism are joined to break the frangible attachment, and wherein the inner receiving container wall holds the frangible attachment away from the opening while the dispensable substance is dispensed from the opening of the dispensing nozzle.

12. The system of claim 6, wherein to break the frangible obstruction includes to break a frangible attachment between the frangible obstruction and the dispensing nozzle.

13. A device, comprising:

a dispensing portion, including:

a dispensing nozzle, a sleeve, attached to the dispensing nozzle, sealing an opening on a side wall of the dispensing nozzle, and a dispensing-side mating wall encompassing the dispensing nozzle, the dispensing-side mating wall separated from the dispensing nozzle by a cavity; and a receiving portion, including:

an inner receiving container wall defining a passageway into a dispensable substance receiving container, the inner receiving container wall to enter the cavity and introduce fluid communication between the dispensing nozzle and the dispensable substance receiving container by breaking the attachment between the sleeve and the dispensing nozzle.

14. The device of claim 13, wherein the receiving portion includes an outer receiving container wall encompassing the inner receiving container wall, the outer receiving container wall to engage the dispensing-side mating wall and guide the dispensing nozzle into the cavity.

15. The device of claim 13, wherein the inner receiving container wall translates a force load introduced to join the dispensing portion to the receiving portion to a shearing force to break the attachment between the sleeve and the dispensing nozzle.

* * * * *